United States Patent
Friedrich

(10) Patent No.: US 7,999,659 B2
(45) Date of Patent: Aug. 16, 2011

(54) METHOD FOR ACCESS CONTROL

(75) Inventor: Ulrich Friedrich, Ellhofen (DE)

(73) Assignee: Atmel Corporation, San Jose, CA (US)

( * ) Notice: Subject to any disclaimer, the term of this patent is extended or adjusted under 35 U.S.C. 154(b) by 1220 days.

(21) Appl. No.: 11/653,383

(22) Filed: Jan. 16, 2007

(65) Prior Publication Data

US 2007/0176756 A1  Aug. 2, 2007

Related U.S. Application Data

(60) Provisional application No. 60/838,889, filed on Aug. 21, 2006.

(30) Foreign Application Priority Data

Jan. 16, 2006  (DE) .......................... 10 2006 002 516

(51) Int. Cl.
*H04Q 5/22* (2006.01)

(52) U.S. Cl. ................. 340/10.51; 340/10.52; 340/5.21; 340/5.22; 340/5.23; 365/191; 365/195

(58) Field of Classification Search ............... 340/10.51, 340/10.52, 5.21, 5.23, 5.22; 365/195, 191
See application file for complete search history.

(56) References Cited

U.S. PATENT DOCUMENTS

| | | | |
|---|---|---|---|
| 4,178,476 A * | 12/1979 | Frost | ........................... 340/7.27 |
| 6,980,087 B2 | 12/2005 | Zukowski | |
| 7,075,822 B2 * | 7/2006 | Elmhurst et al. | ......... 365/185.03 |
| 7,639,712 B2 * | 12/2009 | Un et al. | ....................... 370/469 |
| 2004/0134984 A1 | 7/2004 | Powell et al. | |
| 2005/0140501 A1 * | 6/2005 | Rizzo et al. | ................. 340/10.51 |
| 2006/0273883 A1 * | 12/2006 | Pillai et al. | ................. 340/10.42 |
| 2007/0008070 A1 | 1/2007 | Friedrich | |

FOREIGN PATENT DOCUMENTS

| | | |
|---|---|---|
| DE | 10 2005 032 473 A1 | 1/2007 |
| DE | 102005032473 | 1/2007 |
| EP | 1742166 A | 1/2007 |

* cited by examiner

*Primary Examiner* — Daniel Wu
*Assistant Examiner* — Ryan W Sherwin
(74) *Attorney, Agent, or Firm* — Baker Botts L.L.P.

(57) ABSTRACT

A method for access control to at least one memory area of a passive and/or backscatter-based transponder is provided. In the method for access control, depending on an identification selection criterion, a first or at least one second identification within the transponder is activated, the activated identification upon an appropriate request by reader unit is transmitted to said unit, the at least one memory area of the transponder is divided into memory blocks with a settable size, access control information is assigned to a respective memory block, and read and/or write access to a specific memory block is released or blocked depending on the associated access control information and the identification selection criterion.

3 Claims, 1 Drawing Sheet

METHOD FOR ACCESS CONTROL

This nonprovisional application claims priority to U.S. application Ser. No. 11/481,896, which was filed on Jul. 7, 2006, claims priority to Provisional Application No. 60/838,889, which was filed on Aug. 21, 2006, and claims priority to German Patent Application No. DE 102006002516, which was filed in Germany on Jan. 16, 2006, and which are all herein incorporated by reference.

BACKGROUND OF THE INVENTION

1. Field of the Invention

The present invention relates to a method for access control to at least one memory area of a passive and/or backscatter-based transponder.

2. Description of the Background Art

Access control methods are used, for example, in contactless identification systems or so-called Radio Frequency Identification (RFID) systems. This type of system typically includes a base station or a reader or a reader unit and a plurality of transponders or remote sensors, which are located simultaneously in the response range of the base station. The transponders or their transmitting and receiving devices typically do not have an active transmitter for data transmission to the base station. Such inactive systems are called passive systems, when they do not have their own power supply, and semipassive systems, when they have their own power supply. Passive transponders draw the energy necessary for their supply from the electromagnetic field emitted by the base station.

Backscatter coupling is employed, as a rule, for data transmission from a transponder to a base station with UHF or microwaves in the far field of the base station. To that end, the base station emits electromagnetic carrier waves, which are modulated and reflected by the transmitting and receiving device of the transponder by means of a modulation method in accordance with the data to be transmitted to the base station. The typical modulation methods for this are amplitude modulation, phase modulation, and amplitude shift keying (ASK) subcarrier modulation, in which the frequency or the phase position of the subcarrier is modified.

An access control method for transponders is described in the draft standard ISO/IEC_CD 18000-6C of 7 Jan. 2005. The transponder in this case is first selected in a selection or arbitration process from a number of transponders. The described selection process is a stochastic process in the form of a slot-based ALOHA protocol. Selection methods of this kind are described in detail, for example, in the handbook by Klaus Finkenzeller, RFID-Handbuch (RFID Handbook), $3^{rd}$ ed., HANSER, 2002.

When the transponder is chosen or selected or singled out, the reader unit transmits a request to the transponder in the form of a retransmission of a random number previously transmitted by the transponder within the scope of the arbitration process, whereupon the transponder transmits protocol control bits (PC) and an identification in the form of a so-called electronic product code (EPC) to the reader unit. The protocol control bits contain information on a physical layer of the transmission path. The identification or the electronic product code EPC represents inter alia a product tagged with the transponder. The assignment of EPC to the tagged product is standardized, so that the product can be inferred from the EPC information. Furthermore, the EPC can be used by the reader unit as a pointer to other information, for example, to a password assigned to the EPC. The password can then be used to block memory areas in the transponder for write accesses.

The transmission of the EPC upon request to the reader unit holds certain risks, however. Thus, during transport of products unauthorized persons can search selectively for products of a certain type, for example, high-quality watches or weapons, because the product-identifying EPC is transmitted unprotected. To accomplish this, it is only necessary to bring a suitable reader into the range of the transponders, for example, to a highway parking area or into train stations.

After the transmission of the PC and EPC by the transponder, read and/or write access to memory areas within the transponder is possible through the reader unit, unless the specific areas are blocked or locked for write access. Furthermore, read access to passwords can also be barred. Despite a possible read locking of passwords, there is some security risk that unauthorized persons have access to perhaps private memory contents.

When the transponder is used in so-called chip cards, personal data may be stored as memory contents. It is desirable here as well to regulate access to these data, for example, so that upon entry into a store it cannot be determined automatically by reading the memory contents whether the particular customer still has funds on the chip card.

SUMMARY OF THE INVENTION

It is an object of the present invention to provide a method for access control, method which makes possible a powerful and flexible access control to memory areas of the transponder and efficient memory utilization.

German Patent Application DE 10 2005 032 473.8, which corresponds to U.S. application Ser. No. 11/481,896, which is incorporated herein by reference, describes a method for controlling access to a transponder, which reliably prevents unauthorized access to memory areas of the transponder, particularly to the EPC, and is simultaneously compatible with the named ISO draft standard. In this method, at least one second identification and an identification selection criterion are stored in the transponder, upon request by the reader unit, depending on the identification selection criterion, either the first identification or the at least second identification is transmitted and, when the second identification is transmitted, read and/or write access to the transponder, particularly to the first identification, is released by the transponder only when the reader unit transmits a password, assigned to the second identification, to the transponder.

In the method for controlling access, according to an embodiment of the invention, to at least one memory area of a passive and/or backscatter-based transponder, depending on an identification selection criterion, one first or at least one second identification within the transponder is activated, the activated identification upon an appropriate request by a reader unit being transmitted to the transponder. The at least one memory area of the transponder is divided into memory blocks with a settable and substantially identical size, and access control information is allocated to a specific memory block. Read and/or write access to a specific memory block is released or blocked depending on the associated access control information and the identification selection criterion. This enables an identification-specific access control to the specific memory blocks, and by virtue of the subdivision of the memory area into individual memory blocks a finely defined access control is possible, as a result of which an efficient utilization of the available memory can be achieved. If, for example, the transponder is installed to monitor a cooling chain in a product that is to be monitored, the transponder writes, for example, a maximum temperature value it measures in a predefined memory block of the memory area.

In order to prevent a stored too high temperature value from being changed by an unauthorized user to a permissible temperature value, unauthorized write access to this memory block can be prevented by an appropriate setting of the access control information identification-specific or user-specific. It is possible, however, to permit simultaneously write access to other memory blocks of the same memory area in which, for example, the contractor is entered.

In an embodiment, the access control information can be stored in an only one-time programmable memory (OTP) of the transponder. The access control information in this case may be set only once and then no longer reset. The one-time setting of the access control information may be done, for example, during the manufacture of the transponder or during an initial startup. A possible unauthorized release of memory blocks by manipulation of the access control information is prevented in this way.

In an embodiment, the access control information can comprise two bits; in this case, a first bit pattern, made up of the two bits, releases read and write access to the specific memory block regardless of whether the first identification or the second identification is activated. The first bit pattern enables a downward-compatible operation of the transponder, because unrestricted access to the memory block remains possible. A second bit pattern, made up of the two bits, enables read and write access to the specific memory block only with an activated first identification and prevents access, read and write, when the first identification is deactivated, i.e., when the second identification is activated. Accordingly, a third bit pattern, made up of the two bits, enables read and write access to the specific memory block only with an activated second identification and blocks access with a deactivated second identification, i.e., activated first identification. In this way, it is possible to release or block memory blocks identification-dependent or user-dependent. A fourth bit pattern, made up of the two bits, releases read access to the specific memory block independent of identification. Write access is blocked regardless of whether the first identification or the second identification is activated. For example, the first bit pattern can be, "00," the second bit pattern "01," the third bit pattern "10," and the fourth bit pattern "11," each in binary notation.

In an embodiment, access to the transponder can be released by the transponder only when the reader unit transmits a password, assigned to the activated identification, to the transponder. Without access release, for example, no read or write access whatsoever can be possible.

In a further embodiment, the memory block can have a size of an integer multiple of 8 bits. A fine division and hence utilization of the transponder memory is possible in this way.

Access to the entire memory area at a preconnected access level can be controlled by a memory area access control information comprising 2 bits, whereby for a first value of the memory area access control information, write access to the memory area is released independent of a transponder status information, for a second value of the memory area access control information, write access to the memory area is released depending on the transponder status information, and for a third value of the memory area access control information, write access to the memory area is blocked permanently. Reference is made to the access control described in the draft standard ISO/IEC_CD 18000-6C of 7 Jan. 2005 in 6.3.2.10.3.5. In this case, a memory area corresponds to a memory bank of the draft standard. A status information or status of the transponder, in which write access is possible for the second value of the memory area access control information, is called "secured" in the draft standard. The combination of the access control information at the memory block level and the memory area access control information at the memory area level enables a standard-conforming operation, whereby a robust access rights subdivision of the memory area or memory bank is possible when needed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
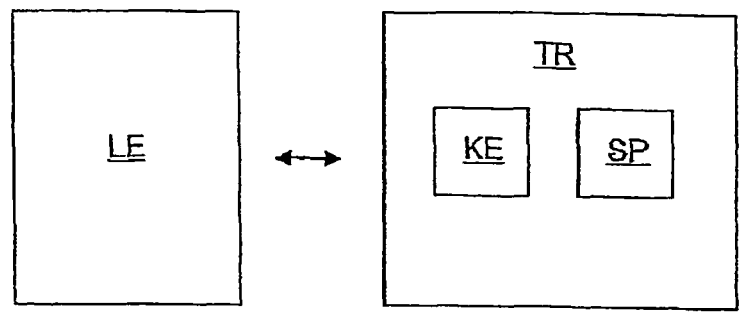
FIG. 1 illustrates a block diagram of an RFID system with a reader unit and a transponder.

FIG. 1 shows schematically a block diagram of an RFID system with a base station or reader unit LE and a passive backscatter-based transponder TR, which are each configured, for example, such that in their basic functions they operate in conformity with ISO/IEC_CD 18000-6C of 7 Jan. 2005. The transponder TR comprises, in addition to other conventional functional units (not shown), a nonvolatile memory SP and a cryptography unit KE.

Figure 2:
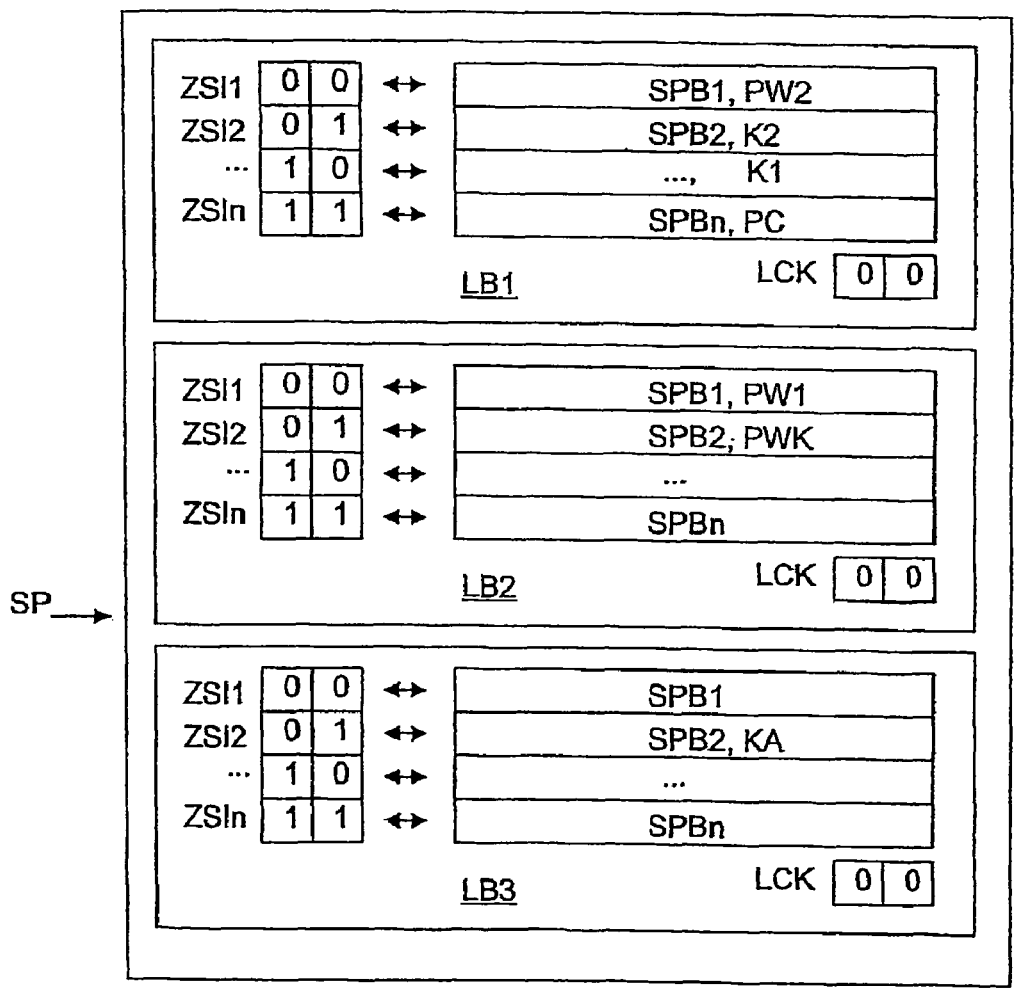
FIG. 2 illustrates a memory map of the transponder shown in FIG. 1.

FIG. 2 shows a memory map of the memory SP of the transponder TR as shown in FIG. 1. The physical memory SP is divided into logic memory areas or memory banks LB1 to LB3, which are used as the address specification or index during memory access by the reader unit LE to the transponder TR. In addition to the indicated memory areas, further memory areas may be provided, which are not shown here.

The logic area LB1 is used to store a first identification K1 in the form of an electronic product code EPC, a second identification K2, and protocol control bits PC. The logic area LB2 is used to store a public password PW1, assigned to the first identification K1, and a kill password PWK. The kill password PWK is used to deactivate the transponder TR permanently for data protection reasons, for example, when a product labeled by the transponder TR is scrapped, i.e., to block permanently read and write access.

The area LB3, which forms a user memory for storing user-specific data, contains an identification selection criterion KA in the form of a settable bit value. The first identification is selected if the bit value is "1" and the second identification is selected if the bit value is "0." The specifically activated identification upon an appropriate request by the reader unit LE is transmitted to the unit.

A public password PW2 assigned to the second identification K2 can be stored in memory area LB2 and/or in memory area LB1. In the shown embodiment, password PW2 is stored in memory area LB1, because the kill password PWK and an associated kill functionality are activated. When the kill functionality is deactivated, however, (i.e., no kill password PWK is required), it is also possible to store password PW2 in memory area LB2 of the kill password PWK.

The memory areas or memory banks LB1 to LB3 are each divided into memory blocks SPB1 to SPBn, each of which have a size of, for example, 32 bits. An associated access control information ZSI1 to ZSIn, which comprises two bits, is assigned respectively to the memory blocks SPB1 to SPBn. The access control information ZSI1 to ZSIn is stored in only one-time programmable memory cells of the transponder TR. They are set to the desired value, for example, during a first startup of the transponder TR.

Read and/or write access to a specific memory block SPB1 to SPBn is released or blocked depending on the associated access control information ZSI1 to ZSIn and the identification selection criterion KA.

When the access control information ZSI1 to ZSIn has a binary value of "00," read and write access to the associated memory block SPB1 to SPBn is released, regardless of whether the first identification or the second identification is activated, i.e., which value the identification selection criterion KA has.

When the access control information ZSI1 to ZSIn has a binary value of "01," read and write access to the associated memory block SPB1 to SPBn is released only when the first identification is activated, i.e., when the identification selection criterion KA has a value of 1.

When the access control information ZSI1 to ZSIn has a binary value of "10," read and write access to the associated memory block SPB1 to SPBn is released only when the second identification is activated, i.e., when the identification selection criterion KA has a value of 0.

If the access control information ZSI1 to ZSIn has a binary value of "11," write access is no longer possible independent of the identification selection criterion KA. The memory blocks SPB1 to SPBn can be read only in this case, the read release being independent of the value of the identification selection criterion KA.

Read and/or write access to the transponder in an embodiment can be released only when the password PW1 or PW2 assigned to the activated identification is transmitted by the reader unit LE to the transponder TR. Another possibility is that read and/or write access to the transponder with an activated second identification is released only when the password PW2 assigned to the second identification is transmitted to the transponder, but with an activated first identification read and/or write access is also possible without prior password transmission of the password PW1.

With respect to the type of password transmission, the setting of the identification selection criterion KA, the function of the cryptography unit KE, and other transmission protocol-specific details, reference is made to the German patent application DE 10 2005 032 473.8, which, as noted above, corresponds to U.S. application Ser. No. 11/481,896.

Memory area access control information is still provided in the memory areas LB1 to LB3 in the form of lock bits LCK, which control access to the entire memory area LB1 to LB3 at a preconnected access level.

For a binary value of "00" of the lock bits LCK, write access to the memory area LB1 to LB3 is released independent of transponder status information.

For a binary value of "01" of the lock bits LCK, write access to the memory area LB1 to LB3 is always possible; i.e., locking is not possible. Of course, locking of the suitable setting of the access control information ZSI1 to ZSIn memory block-specific continues to be possible.

For a binary value of "10" of the lock bits LCK, write access is possible only in a "secured" state of the transponder TR. With respect to relevant details, reference is made to the draft standard ISO/IEC_CD 18000-6C of 7 Jan. 2005.

For a binary value of "11," write access to the memory area LB1 to LB3 is blocked permanently. This state is also called "permalocked."

The shown embodiments enable a powerful and flexible access control to the memory areas LB1 to LB3 at the memory block level, as a result of which efficient memory utilization can be achieved.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for access control to at least one memory area of a passive and/or backscatter-based transponder, the method comprising:

activating a first or at least one second identification within the transponder, based on an identification selection criterion;

transmitting the activated identification upon a request by a reader unit to the reader unit, dividing at least one memory area of the transponder into memory blocks of a settable size;

assigning access control information to a respective memory block; and releasing or blocking read and/or write access to a specific memory block based on the associated access control information and the identification selection criterion, wherein the access control information comprises two bits, wherein a first bit pattern, made up of the two bits, releases read and write access to the specific memory block regardless of whether the first identification or the at least one second identification is activated, wherein a second bit pattern, made up of the two bits, blocks read and write access to the specific memory block with an activated first identification and blocks with a deactivated first identification, wherein a third bit pattern, made up of the two bits, releases read and write access to the specific memory block with an activated second identification and blocks with a deactivated second identification, and wherein a fourth bit pattern, made up of the two bits, releases read access to the specific memory block and blocks write access, regardless of whether the first identification or the at least one second identification is activated.

2. The method according to claim 1, wherein the first bit pattern is "00," the second bit pattern is "01," the third bit pattern is "10," and the fourth bit pattern is "11," which are expressed in binary notation.

3. A method for access control to at least one memory area of a passive and/or backscatter-based transponder, the method comprising:

activating a first or at least one second identification within the transponder, based on an identification selection criterion;

transmitting the activated identification upon a request by a reader unit to the reader unit, dividing at least one memory area of the transponder into memory blocks of a settable size;

assigning access control information to a respective memory block; and releasing or blocking read and/or write access to a specific memory block based on the associated access control information and the identification selection criterion, wherein access to the memory area at a preconnected access level is controlled by a memory area access control information comprising 2 bits, wherein for a first value of the memory area access control information, write access to the memory area is released independent of a transponder status information for a second value of the memory area access control information, wherein write access to the memory area is released based on the transponder status information, and wherein, for a third value of the memory area access control information, write access to the memory area is blocked permanently.

* * * * *